June 12, 1934.  W. L. MORRISON  1,962,965
AUTOMOBILE DOOR
Filed Aug. 31, 1932    2 Sheets-Sheet 1
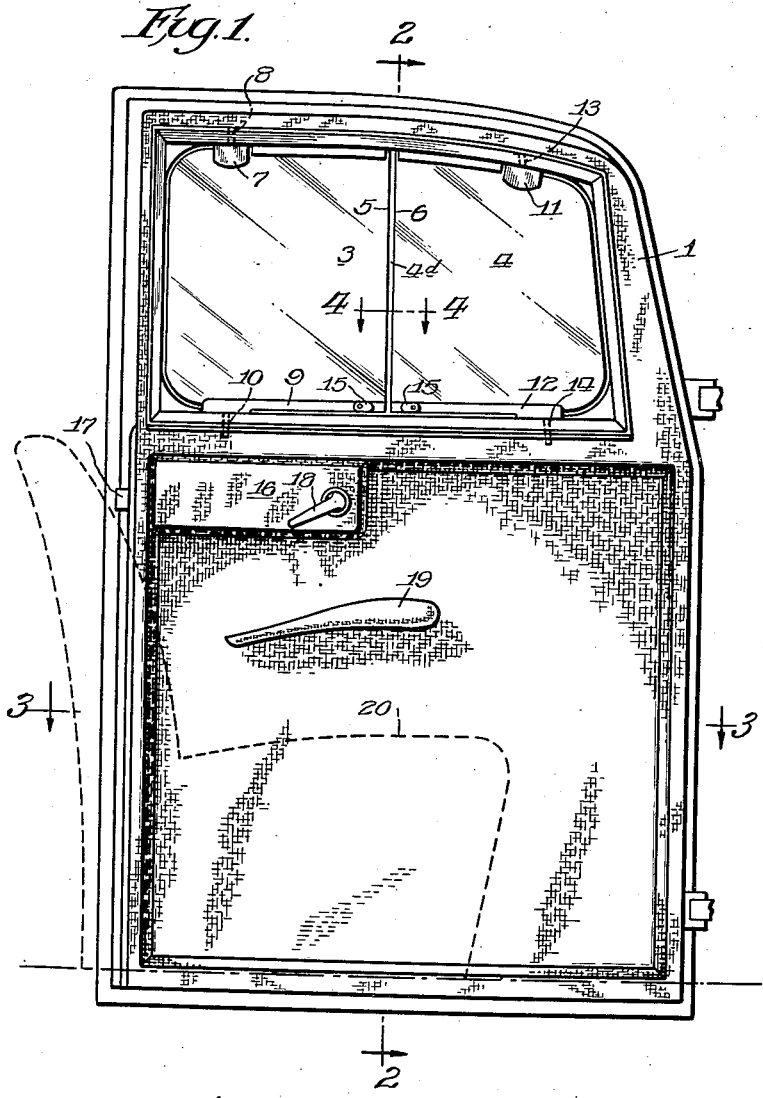
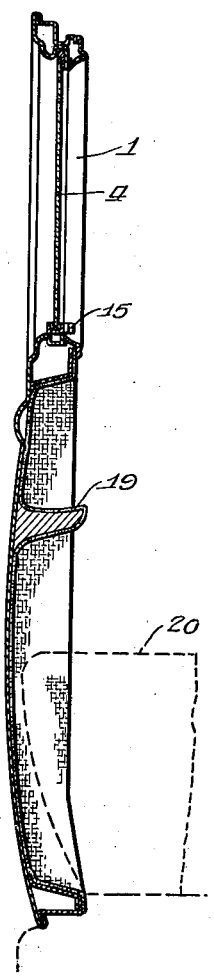
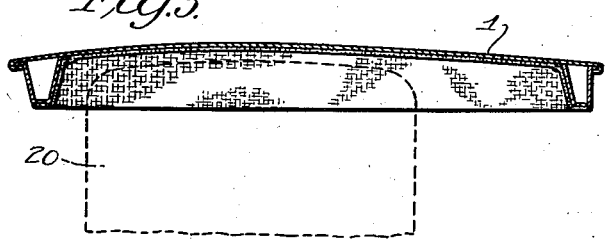
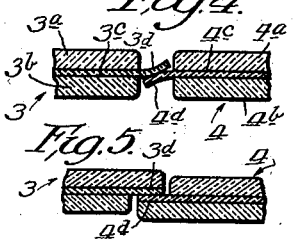
Inventor
Willard L. Morrison
By Parker & Carter Attys.

June 12, 1934. W. L. MORRISON 1,962,965
AUTOMOBILE DOOR
Filed Aug. 31, 1932 2 Sheets-Sheet 2
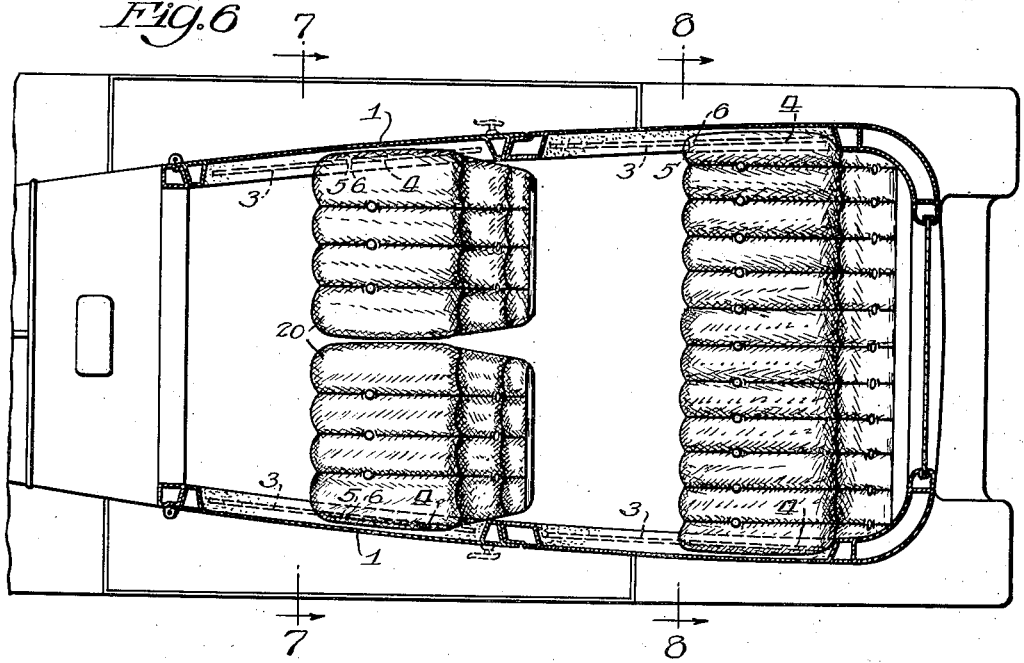
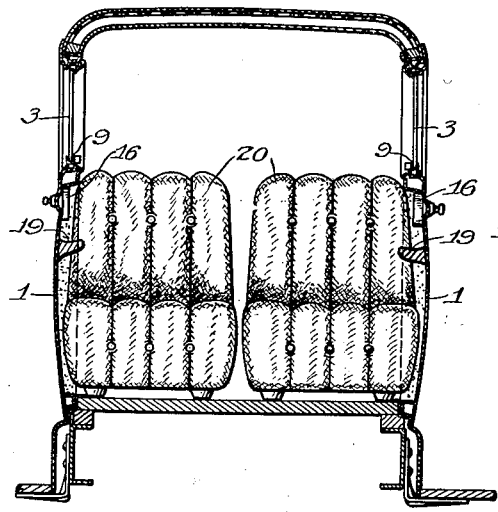
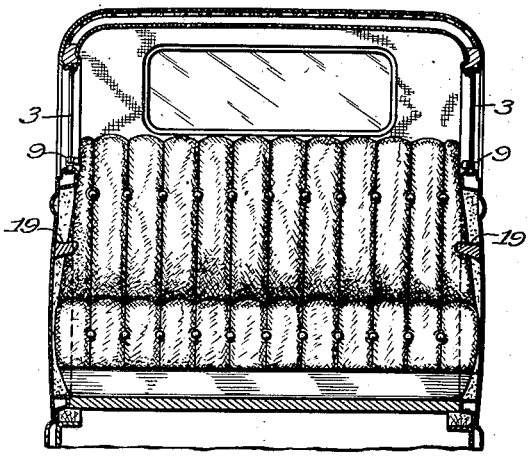
Inventor
Willard L. Morrison
By Parker & Carter
Attys Patented June 12, 1934

1,962,965

UNITED STATES PATENT OFFICE 1,962,965

AUTOMOBILE DOOR

Willard L. Morrison, Chicago, Ill.

Application August 31, 1932, Serial No. 631,135

10 Claims. (Cl. 296—44)

This invention relates to improvements in automobile doors and has for its object to provide a new and improved device of this description. The invention has as a further object to provide an automobile door which shall be free from pockets for the windows and which shall, therefore, give more room crosswise of the automobile, and which shall at the same time cheapen the construction cost of the automobile. The invention has as a further object to provide an automobile door having an ordinary sealed window which may also be used as an air deflector or an air scooper and which can be moved when desired to provide a substantially complete open window without the use of a pocket or a receptacle in the door as is now necessary for the ordinary window. The invention has other objects which are more particularly pointed out in the accompanying description.

Referring now to the drawings, Fig. 1 is an inside view of a door embodying the invention, showing the seat in dotted lines;

Fig. 2 is a sectional view taken on line 2—2 of Fig. 1;

Fig. 3 is a sectional view taken on line 3—3 of Fig. 1;

Fig. 4 is a sectional view taken on line 4—4 of Fig. 1;

Fig. 5 is a view showing a modified construction;

Fig. 6 is a view showing a cross section through an automobile embodying the invention;

Figure 7 is a sectional view taken on line 7—7 of Figure 6;

Figure 8 is a sectional view taken on line 8—8 of Figure 6.

Like numerals refer to like parts throughout the several figures.

As illustrated in the drawings, I have shown an automobile door 1, the inner face of the door being shown in Fig. 1. Two glasses 3 and 4 are located in the window space of the door and have their edges 5 and 6 abutting, forming the window of the door. These glasses are pivotally connected to the upper and lower sections of the frame bounding the window opening.

At the top of the glass 3 is a supporting member 7 which has a pin or the like 8 extending into the frame so as to act as a pivot. At the bottom of the glass is another supporting member 9 which has a pin 10 which extends into the frame. The pins 10 and 8 act as pivots so that the glass may be moved out to any desired angular position. The glass 4 has similar supporting members 11 and 12 and similar pins 13 and 14 which act as pivots. The supports for the glass are preferably near the ends of the glass farthest from their meeting edges.

The glasses 3 and 4 are preferably made in separate sheets 3a and 3b and 4a and 4b and between these sheets are sheets of transparent flexible material 3c and 4c, preferably a celluloid material or some similar material is used which is not brittle or friable. The sheets of material 3c and 4c have their edges 3d and 4d projecting from the edges of the glass, as shown in Fig. 4. When the glasses 3 and 4 are then brought together so that their edges abut, these edges 3d and 4d meet, as shown in Fig. 4, to form a water tight joint. It is therefore unnecessary to have the ordinary window, and it is also unnecessary to have any pocket below the window for the reception of anything connected with the window. This space is therefore left free so as to increase the width of the car. The space in each door may be three or four inches, thus increasing the width of the car six to eight inches, in addition to decreasing the expense of making the pocket or the second or inner wall of the pocket, the door requiring only one wall and that the outer wall.

Instead of having the edges of the non-brittle material projecting, as shown in Fig. 4, I may make one of the glass sections of each glass wider than the other so that one glass section overlaps the other, and intermediate them make the parts 3d and 4d simply flush with the end of the sections which overlap so that these parts come into contact, as shown in Fig. 5, so as to make a water tight joint. The other edges of the glasses have water tight joints made in any suitable manner, as by means of the ordinary rubber gaskets or the like.

The glasses may have the locking pieces 15 so that when they are in their closed positions pivoted parts may be moved down so as to be at right angles to the position shown in Fig. 1, locking the parts against outward movement. The inward movement is prevented by the window frame itself. The lock 16 for the bolt 17 of the door is properly encased as shown and is provided with the controlling handle 18 in the usual manner. It will be seen that this construction leaves practically all of the space below the window free. The window construction herein shown is claimed in a divisional application Serial No. 726,344 filed May 18, 1934.

If desired, I may place on the outer wall of the door and projecting inwardly an arm rest which will be in a low position and a comfortable position for the arm of the rider seated in the seat.

I have shown in dotted lines the seat 20 in position and the ends project into the recess in the door, as shown in Figs. 2 and 3, thereby taking the extra space secured crosswise of the car by means of this invention. In Figures 6, 7 and 8 I have shown the seats with both ends projecting into the recesses in the bottom of the doors. As shown in these figures substantially the entire bottom of the doors are recessed, the recesses opening into the interior of the automobile body when the doors are closed, the ends of the seats projecting into these recesses, the recesses being unobstructed by any window or window mechanism. It will be noted as seen in Figs. 6 and 8 that there is a portion of the body under the rear windows made up of the outer wall so as to have the recess and that there is also an arm rest in this recess. The outer wall and the arm rest provide a recess above the arm rest into which the elbow of the rider may be received. It will be further noted that a portion of the body of the rider may be received in the recesses at the sides of the seat so as to give more room and more comfort due to the widening of the interior of the automobile by this construction. I prefer to place the upholstery or finish of the automobile on the inner face of this outer wall so that a proper finish may be provided. This upholstery also acts as a dampener to prevent noise such as drumming. As before stated, in addition to getting the extra space, the construction is reduced in cost from eight to ten dollars per car, which is of vital interest in view of the high competition at present. While I am enabled to increase the width of the inside of the car, I do this, as will be seen, without increasing the outside width, getting the extra space for the increase of inside width from the recess in the door itself. By moving the glasses at right angles to the position shown in Fig. 1 a full open window is secured.

It will be noted that in this construction the seal between the two sections of the glasses 3 and 4 is made by relatively moving these two sections, and that the seal between them is broken or disengaged also by a relative movement of the two sections. When this relative movement brings the two sections towards each other, the seal is made between the parts 3d and 4d, and when the relative movement moves the two sections away from each other, the seal is broken.

It will be noted that the door below the window has only a single wall which is an outer wall, the trim or upholstery attached to this wall. It will further be noted that with this construction the door is recessed below the window and this increases the inside width of the car so that the riders have more width crosswise of the car. I have shown a part of the seat as projecting into this recess, but this width can be used without this as the rider may simply move over toward the door so that a part of his body is received into this recess or space. It will further be noted that I am able to provide this extra width and this space or recess and still have windows which can be opened for ventilating purposes, due to the fact that the glass pieces 3 and 4 are pivotally connected in the window opening. The front glass piece is pivoted near the front and the rear glass piece near the rear so that they may be moved out to proper angles to secure ventilation. I am not claiming in this case this ventilating feature, as it is set out in my copending aplication filed of even date herewith.

I claim:

1. A car door having a window opening and comprising a window always positioned in the window opening, the lower part of the door below said window having a single wall, said door being recessed to receive the end of the seat.

2. A car door having a window opening and comprising a movable window, the lower part of the door below said window having a single outer wall, said door being recessed to receive the end of the seat, and an arm rest on the wall of the door in position to receive the arm of the occupant of the seat.

3. A door for automobiles having a window opening, with a window in said opening adapted to be opened and closed, an outer wall for the door below the window, substantially the entire bottom of the door being recessed, such recess opening into the interior of the automobile body when the door is closed.

4. An automobile comprising a body portion, two opposed doors therefor, a seat between them, substantially the entire bottom of said doors being recessed, into which recessed lower ends of said doors the ends of the seat project.

5. An automobile comprising a body portion, two opposed doors thereon, windows in the upper part of said doors, means for opening said pivoted windows, substantially the entire bottoms of said doors being recessed and being free from window operating mechanism, said recesses opening into the interior of the automobile, whereby the inside width of the automobile between said doors is increased.

6. An automobile comprising a body portion, said body portion being provided with two opposed window openings, windows therein always positioned in the window openings, a seat between said window openings, and recesses beneath said window openings into which the ends of the seat project.

7. A door for automobiles comprising a window, and a single wall below said window constituting the outer wall of the door, substantially the entire bottom of the door being recessed, into which recessed bottom portion of the door a part of the body of the rider may be received.

8. A door for automobiles comprising a window, a single wall below said window constituting the outer wall of the door, and an arm rest below the window and connected with said outer wall.

9. A door for automobiles comprising a window, and a single wall below said window constituting the outer wall of the door so as to form a space below the window, opening into the automobile, the upholstery for the automobile being connected to the inner face of said single wall.

10. An automobile comprising a portion having a window therein, a wall below said window constituting the outer wall of the automobile, an arm rest below the window, and in proximity to said outer wall, said outer wall and the arm rest providing a recess above said arm rest, into which the elbow of the rider may be received.

WILLARD L. MORRISON.